Nov. 4, 1930.  A. W. FREHSE ET AL  1,780,749
CLUTCH
Filed June 21, 1926  2 Sheets-Sheet 1

Inventors
Albert W. Frehse
& Clements G. Belden
by Blackmore, Spencer & Field
Attorneys Nov. 4, 1930.  A. W. FREHSE ET AL  1,780,749
CLUTCH
Filed June 21, 1926    2 Sheets-Sheet 2

Inventors
Albert W. Frehse
& Clements F. Belden
By Blackmore, Spencer & Hail
Attorneys Patented Nov. 4, 1930

1,780,749

UNITED STATES PATENT OFFICE

ALBERT W. FREHSE AND CLEMENTS G. BELDEN, OF DETROIT, MICHIGAN, ASSIGNORS TO GENERAL MOTORS CORPORATION, OF DETROIT, MICHIGAN, A CORPORATION OF DELAWARE

CLUTCH

Application filed June 21, 1926. Serial No. 117,432.

This invention relates to new and useful improvements in clutches for motor vehicles or the like.

An object of the invention is to provide a self-adjusting and self-aligning release mechanism.

Another object of the invention is to provide a novel means for resiliently holding the ends of the release levers in operative position.

Another object of the invention is to provide a simple and practical means to hold the release thrust bearing and parts in position, and to avoid rattle and noise during operation.

With these and other objects in view, the invention consists in the novel arrangement, construction and combination of various parts and more particularly described in the following specification and pointed out in the annexed claims.

In the accompanying drawings.

Like numerals of reference designate corresponding parts.

Figure 1:
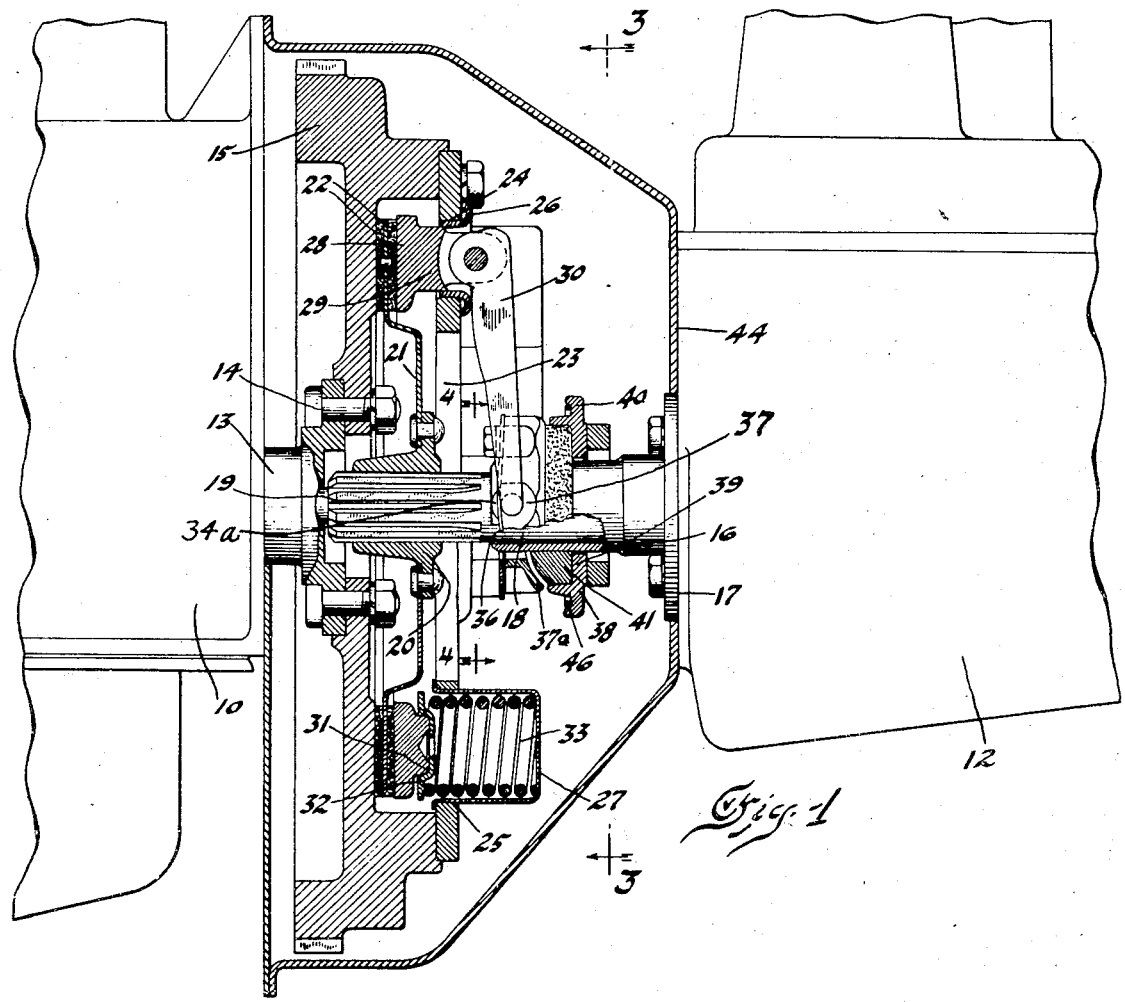
Figure 1 is a longitudinal sectional view of the clutch as assembled between an engine and transmission.
Figure 2:
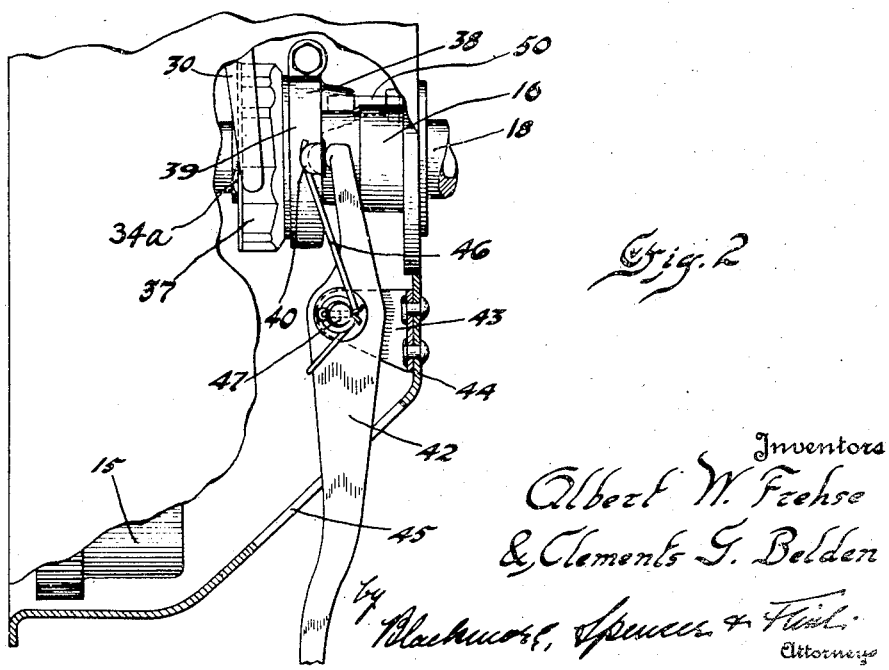
Figure 2 is a fragmentary plan view of the clutch with parts of the clutch casing broken away to show the manner of engagement of the release yoke with the thrust release bearing.

Referring to the drawings, the numeral 10 indicates the rear end of an internal combustion engine operatively associated with the clutch mechanism and the transmission 12. Bolted to the crankshaft 13 of the engine by bolts 14 is a fly-wheel 15. Arranged in a bearing sleeve 16 secured to the forward end of the transmission by bolts 17 is the clutch shaft 18. This shaft has its forward end splined as indicated at 19, and has keyed on it a flanged hub 20 carrying the clutch disc 21 provided with the friction rings 22.

Figure 3:
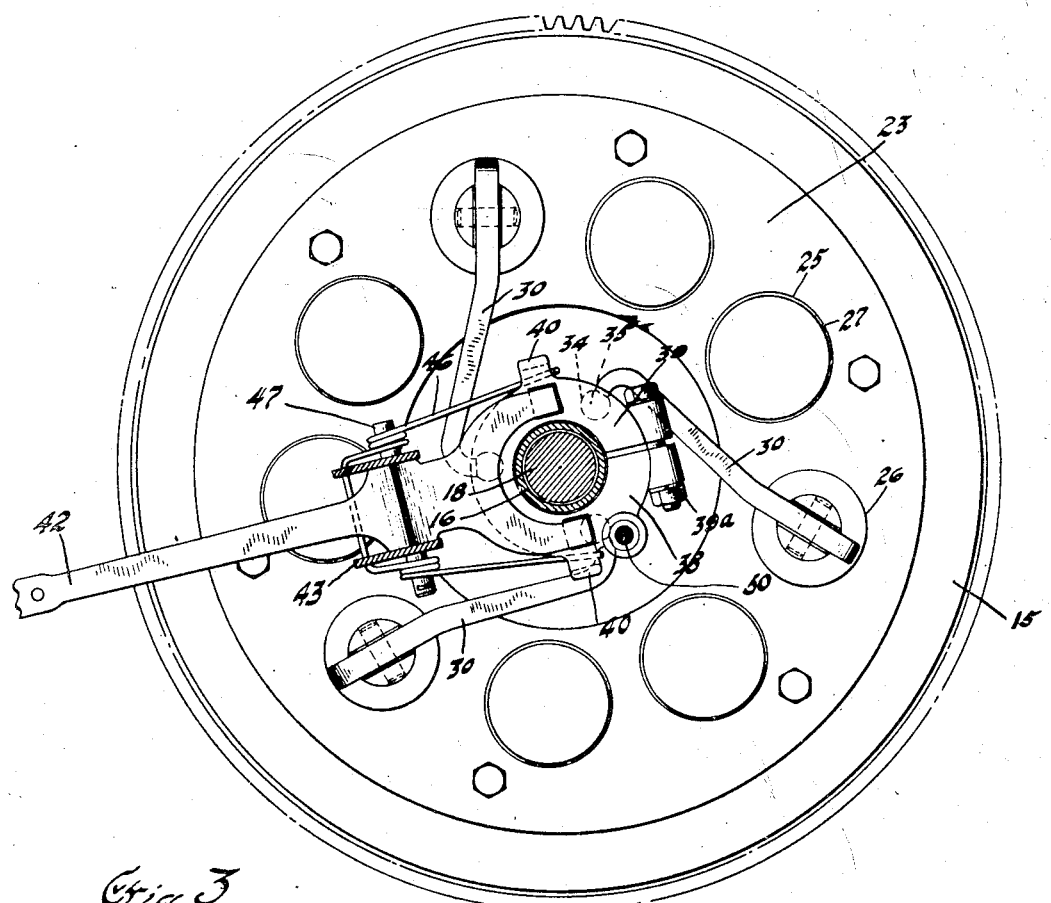
Figure 3 is a sectional elevation view taken on the line 3—3 of Figure 1, and showing the casing removed.

Secured to the fly-wheel 15 is a cover plate 23 formed with a number of openings 24 and 25 (see Figures 1 and 3). The openings 24 are provided with metal bushings 26, and the openings 25 have mounted therein spring retaining cups 27. Interposed between the driven disc 21 and the said cover is a clutch thrust plate 28. This plate has a number of bosses 29 which project through the openings 24 and bushings 26, and have the release levers 30 pivotally secured thereto.

Short bosses 31 are also provided about the plate 28 at points registering with the said openings 25, and against which the coil springs 33 housed within the cups 27 bear, causing engagement between the thrust plate 28, friction rings 22 and the side of the flywheel.

Figure 4:
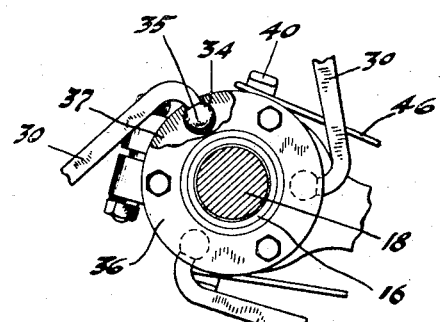
Figure 4 is a sectional view taken on the line 4—4 of Figure 1, of the clutch release collar showing the release levers secured thereto.

The clutch release collar 37, which is slidably mounted upon the bearing sleeve 16 and shaped as shown in Figures 1 and 4, has a number of circular recesses 34 about the periphery of one face to receive the ball ends 35 of the fulcrum release levers 30. A spring steel plate 36, also having similar recesses 34ª registering with the recesses 34, is bolted to the side of the collar 37, and is adapted to resiliently hold the levers 30 in position (see Figure 4). The opposite face of the collar 37 is formed with a concave spherical surface 37ª (see Figure 1).

Also, slidably mounted upon the bearing sleeve 16 and adjacent thereto is the clutch release bearing 38, which consists of a split adjustable ring 39, provided with a clamping bolt 39ª, and with lateral ears 40, carrying an annular anti-friction shoe 41 made of pressed graphite or the like, and having a convex spherical face for engagement with the said concave surface 37ª. The clutch release bearing 38 is held from turning on the bearing sleeve 16 by the stud 50 which extends out from the transmission and upon which the clutch release bearing is free to float axially.

A clutch release yoke lever 42 is pivotally mounted in a bracket 43 secured to the wall of the clutch casing 44, and projects outward from the casing through an opening 45 formed therein. The yoke ends of the lever are arranged to bear against each side of the clutch release bearing 38, and a U-shaped spring 46 straddles the lever and coils around the lever pin 47, the ends being in resilient engagement with said lateral ears 40 of the release bearing 38.

It will be apparent that this spring not only retains the said bearing in retracted position during the engagement of the clutch, but serves also to keep it in engagement with the clutch release yoke lever 42, thus preventing rattle between the parts.

In operation, a force applied to the end of the release yoke lever 42 moves the bearing 38 forward with the shoe 41 bearing against the concave surface 37ᵃ of the clutch release collar, which is also moved forward causing the inner ends of the release levers 30 to move forward, thereby causing the levers 30 to fulcrum about the point where they bear against the bushings 26, thus releasing the clutch.

It must be understood that inasmuch as the bearing surfaces of the release collar and the inner ends of the release levers are spherical, the engagement is always smooth and free of wobble and vibration.

From the herein described construction it will be readily seen that the clutch release bearing is adapted to compensate for any of the irregularities in the construction of the clutch release collar and its connections. Furthermore, it will be understood that the provision of a graphite curved bearing surface in the release bearing makes possible even wear, lengthens the life of the bearing facing, avoids the necessity of the use of oil and serves as a most satisfactory anti-frictional bearing.

Moreover, a resilient means is provided for retaining the ends of the clutch release levers in the release collar, which permits of easy operation and compensates for wear, and a very simple yet efficient means is provided for retaining in retracted position during the clutch engagement the bearing which, as mentioned elsewhere in the specification, also maintains engagement between the clutch release yoke lever and bearing for preventing rattle.

Modifications of the above may be made within the spirit and scope of the invention.

What we claim is:

1. The combination with a clutch casing and a clutch mounted therein, of a clutch shaft, a clutch release collar operatively in engagement with the said shaft and provided with a curved concave bearing surface, a bearing mounted about the shaft, an annular anti-friction shoe carried in the said bearing for engagement with the curved surface of the release collar, an oscillating lever fulcrumed within the said casing and having bifurcated arms engaging with the said bearing, a spring extending about the transverse axis of the said lever and engaging with lugs formed on the sides of the bearing whereby the latter is urged rearwardly out of engagement with the release collar.

2. The combination with a clutch casing and a clutch mounted therein, of a clutch shaft, a clutch release collar formed with a concave bearing surface, a clutch release bearing slidably mounted about the clutch shaft and provided with a convex spherical face for engagement with the concave bearing surface of said release collar, an oscillating lever pivoted adjacent the said clutch shaft and formed with bifurcated arms which straddle the bearing and engage therewith, and a U-shaped spring extending about the pivot of the lever and bearing against the side of the said clutch release bearing.

In testimony whereof we affix our signatures.

ALBERT W. FREHSE.
CLEMENTS G. BELDEN.